(12) United States Patent
Sharifi Mehr

(10) Patent No.: US 10,521,584 B1
(45) Date of Patent: Dec. 31, 2019

(54) COMPUTER THREAT ANALYSIS SERVICE

(71) Applicant: Amazon Technologies, Inc., Seattle, WA (US)

(72) Inventor: Nima Sharifi Mehr, Vancouver (CA)

(73) Assignee: Amazon Technologies, Inc., Seattle, WA (US)

( * ) Notice: Subject to any disclaimer, the term of this patent is extended or adjusted under 35 U.S.C. 154(b) by 137 days.

(21) Appl. No.: 15/688,811

(22) Filed: Aug. 28, 2017

(51) Int. Cl.
  *G06F 21/55* (2013.01)
  *H04L 29/06* (2006.01)
  *G06F 21/56* (2013.01)

(52) U.S. Cl.
  CPC ........ *G06F 21/552* (2013.01); *H04L 63/1416* (2013.01); *H04L 63/1433* (2013.01); *G06F 21/56* (2013.01)

(58) Field of Classification Search
  CPC ... G06F 21/552; G06F 21/56; H04L 63/1416; H04L 63/1433
  See application file for complete search history.

(56) References Cited

U.S. PATENT DOCUMENTS

| | | | | |
|---|---|---|---|---|
| 7,930,746 B1* | 4/2011 | Sheleheda | ........... | H04L 63/1425 713/151 |
| 10,129,276 B1* | 11/2018 | Raviv | ................. | H04L 63/1425 |
| 10,178,119 B1* | 1/2019 | Brandwine | ......... | H04L 63/1433 |
| 2003/0188189 A1* | 10/2003 | Desai | .................... | H04L 63/104 726/23 |
| 2006/0048025 A1* | 3/2006 | Filipovic | ............ | G05B 23/0264 714/724 |
| 2011/0276597 A1* | 11/2011 | Little | .................... | G06F 21/554 707/770 |
| 2013/0326623 A1* | 12/2013 | Kruglick | ............ | H04L 63/1416 726/23 |
| 2015/0074806 A1* | 3/2015 | Roundy | .................. | G06F 21/55 726/23 |
| 2017/0230336 A1* | 8/2017 | Bingham | ............ | H04L 63/0281 |
| 2017/0318053 A1* | 11/2017 | Singh | .................. | H04L 63/1491 |
| 2018/0069885 A1* | 3/2018 | Patterson | ................ | H04L 63/14 |
| 2018/0077175 A1* | 3/2018 | DiValentin | .......... | H04L 63/1416 |
| 2018/0139221 A1* | 5/2018 | Chen | .................... | H04L 63/1425 |
| 2018/0176239 A1* | 6/2018 | Yan | ..................... | H04L 63/1425 |

\* cited by examiner

*Primary Examiner* — Matthew Smithers
(74) *Attorney, Agent, or Firm* — Davis Wright Tremaine LLP

(57) ABSTRACT

A system acquires diagnostic information from event logs, trace files, and other diagnostic sources to reduce a set of event records. The event records are arranged in a graph based on correlations between individual event records. Correlations may be based on time, account, credentials, tags, instance identifiers, or other characteristics. The system analyzes the graph to identify anomalies such as data exfiltration anomalies, system compromises, or security events. In some implementations, the system deploys decoy resources within a customer computing environment. Interactions with the decoy resources are captured as event records and added to the graph.

20 Claims, 12 Drawing Sheets

COMPUTER THREAT ANALYSIS SERVICE

BACKGROUND

Maintaining the security of computer systems is an important and difficult problem. For a single computer system, system logs, firewalls, and other intrusion detection systems provide a certain level of security, but as computer systems become more complex, detecting attacks on the system can become more difficult. For example, a complex computer system may include storage services, computing services, and virtual networking services that are shared across multiple customers as well as services and servers dedicated to individual customers. Attacks can be directed at any number of these systems, and a successful attack may be leveraged to compromise other connected services and subsystems. Therefore, detecting such attacks early is an important step in mitigating and preventing severe system compromise.

BRIEF DESCRIPTION OF THE DRAWINGS

Various techniques will be described with reference to the drawings, in which.

DETAILED DESCRIPTION

Figure 1:
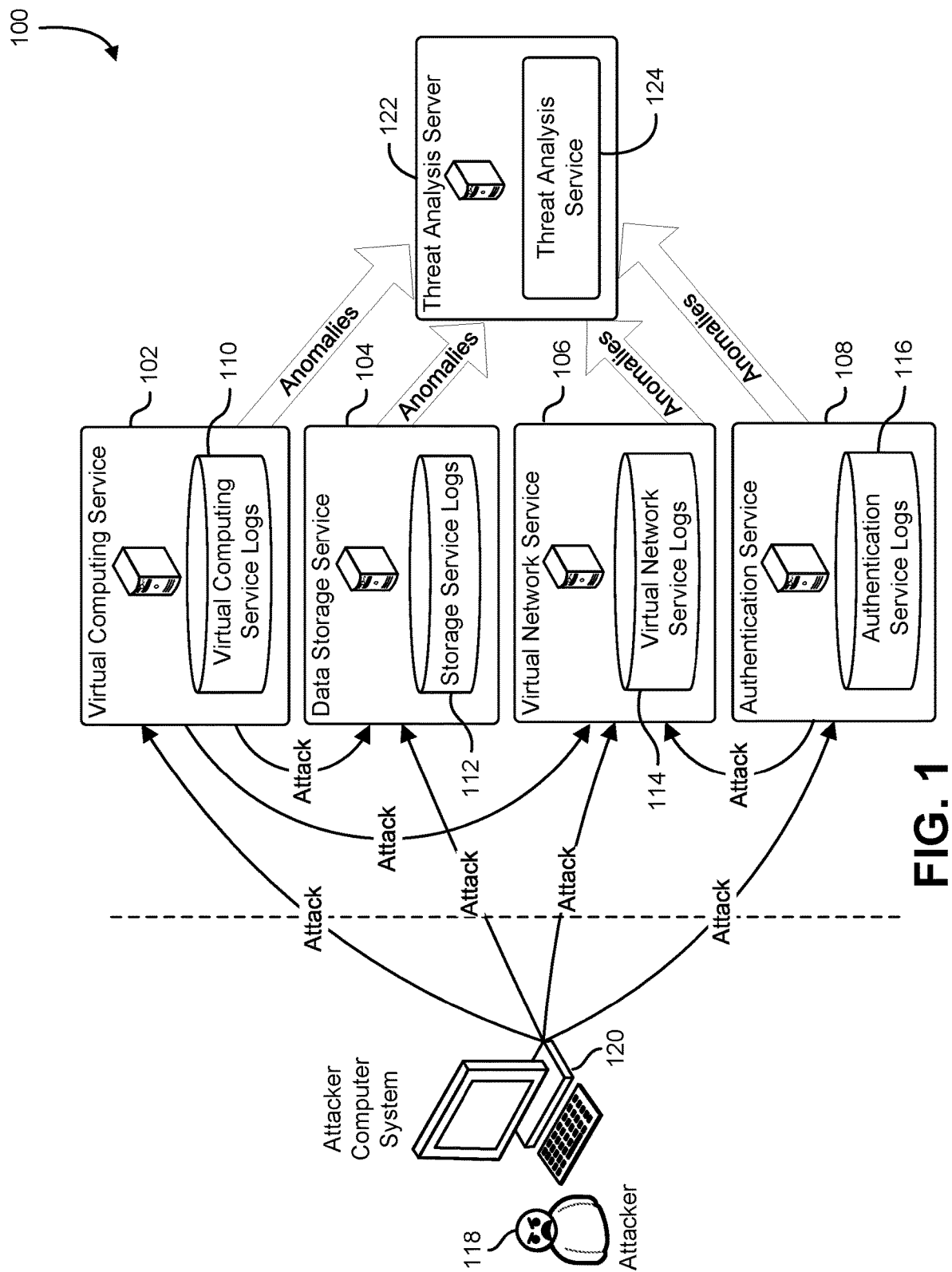
FIG. 1 shows an illustrative example of an environment in which various embodiments may be practiced.

The present document describes a system that provides improved detection of system anomalies by identifying relationships between various system events described in log entries, system alerts, report entries, and other diagnostic information sources. A computing resource service provider provides a threat analysis service that monitors the operation of a customer computing environment. The customer computing environment may include client computer systems, computer servers, data storage services, virtual computing services, authentication services, encryption services, network devices and appliances, virtual networking services, or other services operated by the customer. In some examples, the customer computing environment may include computing resources provided by the computing resource service provider such as data storage resources, processing resources, cryptography resources, and system management services. The threat analysis service acquires diagnostic information for the customer environment by examining log entries, event logs, trace files, and other sources of diagnostic information provided by the various computing resources used by the particular customer. In some implementations, the threat analysis service augments the diagnostic information with additional context, and arranges and classifies the diagnostic information to facilitate analysis.

In various examples, the threat analysis service analyzes the diagnostic information to detect anomalies indicating active infiltration, attacks originating from compromised services within a trusted network, sabotage, and data exfiltration attacks. In one implementation, the threat analysis service uses the diagnostic information to generate a graph. Each piece of diagnostic information is used to generate a record, and records that are correlated with each other are linked to form the graph where individual event records are represented by individual nodes of the graph and each edge of the graph links a pair of event records by a matching attribute. In various implementations, the threat analysis service detects correlations between records based at least in part on the time, credentials, account, instance, tags, or other characteristics of the records. The threat analysis service identifies anomalies by identifying characteristics of the resulting graphs.

In various examples, the threat analysis service uses diagnostic information to generate a corresponding stream of events, and classifies the events as trigger events, alert events, and normal events. Trigger events are stored as trigger records in the graph and indicate or suggest a compromise of the customer environment. Examples of trigger events include accessing a decoy computer server deployed within a customer computing environment, using a decoy set of credentials stored on a decoy server, or a failed login attempt at an authentication service used by the customer. Alert events are stored as alert records in the graph and indicate or suggest data exfiltration, data corruption, or other high-risk activity. Examples of alert events include an event describing a large transfer of data to an external network, an event indicating the encryption or deletion of a large amount of customer data, or an event indicating the access of particularly sensitive information. Normal events are stored as event records in the graph and describe other events in the customer computing environment such as user login and logout operations, database access operations, encryption and decryption operations, starting and stopping various services, and data transfer operations.

In some examples, the threat analysis service deploys decoy systems within the customer environment. Decoy systems may include network routers, network switches, network firewalls, computer servers, file servers, or network-based file systems. In some examples, virtual devices or systems may be deployed within a customer environment such as virtual servers, virtual routers providing a virtual subnet, virtual machines, or virtual file servers. In some examples, the threat analysis service deploys decoy data on devices or services used by the customer. For example, the threat analysis service may deploy decoy files within a customer file system, decoy data within a customer database, decoy cookies with the customer browser or decoy cryptographic keys within a cryptographic key server used by the customer.

The threat analysis service uses the resulting graphs to detect connections between events that indicate a potential system vulnerability (alert records) and events that indicate data compromise or exfiltration (trigger records). In some implementations, the threat analysis service uses the graph to identify paths that connect alert records to trigger records. The threat analysis service determines that an anomaly is present when the length of the path is below threshold value set by an administrator. For example, a particular threat analysis service may be configured to indicate the presence of an anomaly when the path between a password reset event (a trigger event) and a large data transfer event (an alert event) has a length of two or less steps. In another implementation, the threat analysis service determines a score for each record in the graph and adds the scores to create a total score for the graph. If the total score of the graph exceeds a threshold value configured by an administrator, the threat analysis service determines that an anomaly is present. When the threat analysis service detects an anomaly, the threat analysis service provides the customer with narratives and visualizations that describe the anomaly. As a result, the customer is provided with actionable intelligence and is better able to respond to an incident. In some examples, the threat analysis service provides customers with ongoing threat level assessment updates. In some implementations, the threat analysis service may use machine learning, statistical and correlational analysis, graph-based anomaly detection, threat intelligence gathering, and dynamic deception techniques to produce improved analysis.

In various examples, the threat analysis service is able to contain a security incident in its early stages without having to navigate through a high volume of alarms resulting from benign activity. The threat analysis service provides customers with ongoing threat level updates, actionable live attack escalation narratives, and visualizations that correspond to evidence of an anomaly. Customers can access the threat analysis service from a management console provided by the computing resource service provider or from a customer management console in the customer environment. Using the management console, the customer is able to configure the threat analysis service with anomaly-detection thresholds, and opt in to additional services such as decoy deployment within the customer computing environment. In some implementations, the threat analysis service monitors the customer environment for a period of time to establish a baseline of activity, and using the baseline activity, automatically determine threshold levels that indicate an anomaly.

FIG. 1 shows an illustrative example of an environment in which various embodiments may be practiced. A system diagram 100 illustrates an example of a computing environment provided to a customer by a computing resource service provider. The computing environment includes a number of computing devices and services including a virtual computing service 102, a data storage service 104, a virtual network service 106, and an authentication service 108.

The virtual computing service 102 provides processing resources for use by a customer. In various examples, the virtual computing service 102 may be a computer system, virtual computer system, computer server, or server cluster allocated by the computing resource service provider to the customer. In some implementations, the computing resource service provider generates a virtual machine, container runtime, or other virtual computing environment which is then deployed and made available to the customer for use. The virtual computing service 102 generates a set of virtual computing service logs 110. The virtual computing service logs 110 may include log files, trace files, diagnostic information, crash dumps, operational message databases, or other diagnostic information generated by the virtual computing service 102.

The data storage service 104 provides a service that allows a customer to store data on a storage device managed by the computing resource service provider. The data storage service 104 may, in various examples, be a network accessible storage device, an online storage service, network attached storage device, or remotely accessible volume allocated to the customer by the computing resource service provider. In some implementations, the computing resource service provider provides a web interface to a storage service implemented on a set of storage servers maintained by the computing resource service provider. The computing resource service provider allocates storage space on the set of storage servers to the customer, and manages access to the storage service using a customer account. The data storage service 104 generates a set of storage service logs 112. The storage service logs may include trace files, error logs, log files, activity logs, audit files, or other diagnostic information generated by the data storage service 104.

The virtual network service 106 provides a computer network configured by the computing resource service provider for use by the customer. The virtual network service 106 may, in various examples, be implemented by the computing resource service provider using a set of configurable virtual network routers, switches and firewalls maintained by the computing resource service provider and allocated to the customer. In some implementations, the computing resource service provider deploys one or more virtual networking devices to create a network environment for the customer. The virtual networking devices may include virtual switches, virtual routers, and virtual firewalls. In some implementations, one or more network appliances may be included in the network environment. The virtual network service 106 generates a set of virtual network service logs 114. In various examples, the virtual network service logs 114 may be assembled from a set of logs, event records, and trace files generated by one or more of the networking devices comprising the network environment.

The authentication service 108 is a service provided by the computing resource service provider that authenticates users and/or user requests for resources controlled by the customer. In some examples, the authentication service 108 is implemented by the computing resource service provider using software running on a computer system managed by the computing resource service provider. Access to the authentication service 108 is provided via a computer network using credentials provided to the customer. In one implementation, the authentication service 108 provides an authenticating token to unauthorized users that may be used access other customer resources. The authentication service 108 generates a set of authentication service logs 116. The authentication service logs 116 may include log files, event records, trace files, and other diagnostic information describing the operation of the authentication service 108. For example, the authentication service logs 116 may include events describing successful and unsuccessful attempts to acquire an authentication token.

An attacker 118 may attempt to use an attacker computer system 120 to compromise the customer computing environment, thereby gaining access to one or more of the services provided to the customer. In various examples, an attack can be initiated from the attacker computer system 120 directly against resource within the customer environment such as the virtual computing service 102, the data storage service 104, the virtual network service 106, or the authentication service 108. If the attacker is successful in compromising one of the services provided to the customer, the attacker may attempt to compromise another service using the already compromised service. For example, an attacker that compromises the data storage service 104 may attempt to modify an executable image stored on the data storage service 104 so that it executes on the virtual computing service 102 and causes the virtual computing service 102 to become compromised. Such attacks may be difficult to detect in a conventional system because evidence of the attack is spread between the virtual computing service logs 110 and the storage service logs 112.

In various embodiments, the threat analysis server 122 hosts a threat analysis service 124. The threat analysis server 122 is able to access the diagnostic information produced by the computer systems in the customer computing environment. In some examples, the threat analysis server 122 is deployed into the customer environment. The threat analysis service 124 is implemented as instructions that execute on the threat analysis server 122. In some examples, the threat analysis server may be a computer system, computing appliance, virtual machine, server cluster, container runtime, or network-based computing service. When executed, the instructions retrieve diagnostic information from the customer environment, analyze diagnostic information, and identify anomalies based at least in part on connections between events that occur in a plurality of customer computing resources. For example, the threat analysis service 124 is able to retrieve the virtual computing service logs 110 and the storage service logs 112, and determine that a compromise of the data storage service 104 has been used to compromise the virtual computing service 102. In this way, the threat analysis service 124 is able to improve the analysis of diagnostic information produced by the customer environment and identify system anomalies with improved accuracy and reliability.

Figure 2:
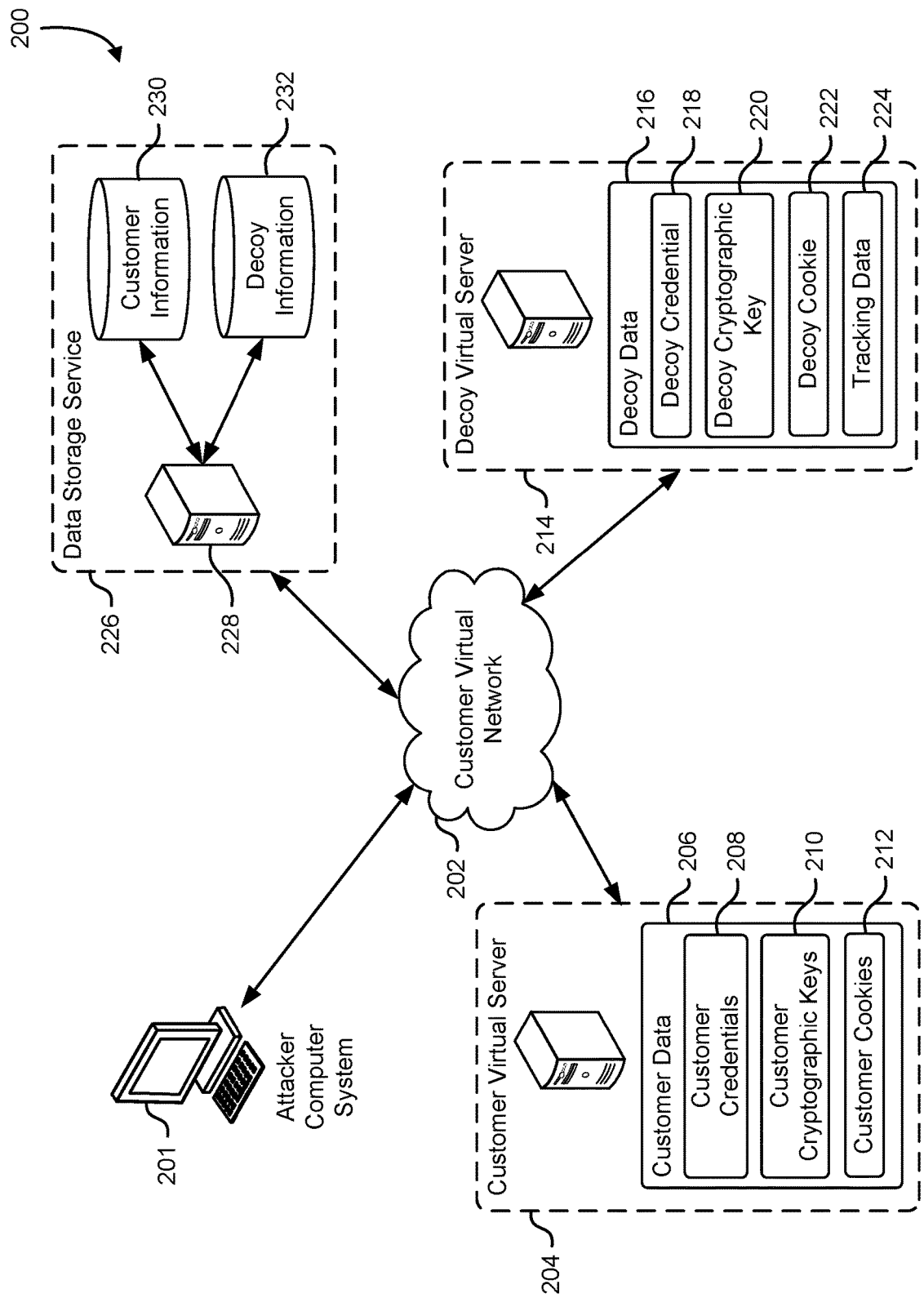
FIG. 2 shows an illustrative example of a virtual network provided to a customer that includes decoy elements, in accordance with an embodiment.

FIG. 2 shows an illustrative example of a virtual network provided to a customer that includes decoy elements, in accordance with an embodiment. A diagram 200 illustrates a customer environment that is under attack from an attacker computer system 201. The customer environment includes a customer virtual network 202 that connects a variety of services and computer systems provided by a computing resource service provider. The customer virtual network 202 is implemented using a combination of virtual routers, virtual switches, virtual hubs, and other network appliances configured by a computing resource service provider for the customer.

A customer virtual server 204 is generated by the computing resource service provider, connected to the customer virtual network 202, and made available to the customer for use. The customer virtual server 204 may be a virtual computer system instance, container runtime, virtual machine, or other processing resource. The customer virtual server 204 retains a set of customer data 206 in a memory or other storage device accessible to the customer virtual server 204. The set of customer data 206 includes a set of customer credentials 208, a set of customer cryptographic keys 210, and a set of customer cookies 212. The set of customer credentials 208 may include a username and password, a one-time use code, or cryptographic key usable to access various customer resources. The set of customer cryptographic keys 210 may include symmetric or asymmetric cryptographic keys used to secure data or establish cryptographically protected communication with other customer computing resources. The set of customer cookies 212 may include browser cookies or other cookies used to track activity on the customer virtual server 204.

In some implementations, the computing resource service provider provides a threat analysis service that deploys decoy resources into the customer environment. In the example shown in FIG. 2, the threat analysis service generates a decoy virtual server 214 and deploys the decoy virtual server 214 into the customer environment by configuring a virtual network interface in the decoy virtual server 214 and configuring the customer virtual network 202 to communicate with the virtual network interface. The decoy virtual server 214 is configured to attract an attacker and cause the attacker to access a set of decoy data 216 stored in the decoy virtual server 214. For example, the decoy virtual server 214 may be assigned a name and identifier that resembles names and identifiers configured by the customer in the customer virtual network 202. In another example, the decoy virtual server 214 is configured with a resource configuration that matches those of the customer virtual server 204. In yet another example, the decoy virtual server 214 is configured to accept credentials that allow access to the customer virtual server 204. In yet another example, the decoy virtual server 214 is unsecured by configuring credentials based on one or more common default passwords that allow access to the decoy virtual server. In yet another example, the decoy virtual server 214 is unsecured by allowing various services hosted on the decoy virtual server to be accessed without a credential. The set of decoy data 216 includes a decoy credential 218, a decoy cryptographic key 220, a decoy cookie 222, and tracking data 224. The decoy credential 218 is a credential that, when used to access a customer resource, causes the customer resource to generate an event that indicates a potential compromise of the customer virtual network. The event is recorded in a log, trace file, or other source of diagnostic information that may be collected by the threat analysis service.

The decoy cryptographic key 220 is a cryptographic key that is accessible via the decoy virtual server 214. In some implementations, the decoy cryptographic key 220 is stored in memory on the decoy virtual server 214. In other implementations, the decoy cryptographic key 220 is stored on a cryptoprocessor used by the decoy virtual server 214. If an attacker uses the decoy cryptographic key 220 to generate a digital signature, encrypt data, or decrypt data, the threat analysis service detects the use of the decoy cryptographic key 220 by verifying the digital signature, decrypting the encrypted data, or detecting the successful decryption of data encrypted with the decoy cryptographic key 220. In some implementations, the threat analysis service examines stored data accessible to the customer virtual network 202 and identifies digital signatures or encrypted data that use the decoy cryptographic key 220. If use of the decoy cryptographic key 220 is discovered, the threat analysis service records diagnostic information that is usable to detect the intrusion.

The decoy cookie 222 is a cookie stored on the decoy virtual server 214. In some examples, the decoy cookie 222 is stored in a browser history on the decoy virtual server 214. If an attacker gains access to the decoy virtual server 214 and accesses the decoy cookie 222, the decoy virtual server 214 records diagnostic information that is usable to detect the intrusion. If the cookie is used to access a service hosted within the customer virtual network 202 such as a Web server, the service also generates diagnostic information that allows the threat analysis service to detect usage of the decoy cookie 222.

The tracking data 224 is other data stored by the decoy virtual server 214 that, when taken by an attacker, can be used to determine the attacker's actions. For example, the tracking data 224 may include a sequence of unique tags that is not prevalent elsewhere in the customer virtual network 202. If the threat analysis system discovers the sequence of unique tags outside the decoy virtual server 214, diagnostic information is stored that allows the attack to be detected. In another example, the tracking data 224 may include information designed to be attractive to the attacker such as false credit card information, false billing information, or other information that appears to be valuable. In yet another example, the tracking data 224 may include credentials, codes, or other access information that allows the attacker to access a decoy service monitored by the threat analysis service. If the tracking data 224 is used to access the decoy service, the threat analysis service generates diagnostic information that indicates where the tracking data 224 originated from and may identify where the decoy service was accessed from.

The customer environment includes a data storage service 226 hosted by a storage device 228. In some implementations, the data storage service 226 is hosted by a storage device owned and operated by the customer. In another implementation, the data storage service 226 is hosted on a storage device managed by the computing resource service provider and made available to the customer. The data storage service 226 is used by the customer to retain a set of customer information 230. The customer information 230 may include executable instructions, payroll records, employee records, databases, or other business information used by the customer. In some examples, the threat analysis service generates and stores decoy information 232 on the data storage service 226. The decoy information 232 may include credentials, cryptographic keys, cookies, or tracking data that is monitored and tracked by the threat analysis service. If an attacker accesses the decoy information 232 retained on the data storage service 226, services and devices in the customer environment may generate events, and events may be acquired and analyzed by the threat analysis service to detect anomalies within the customer environment.

Figure 3:
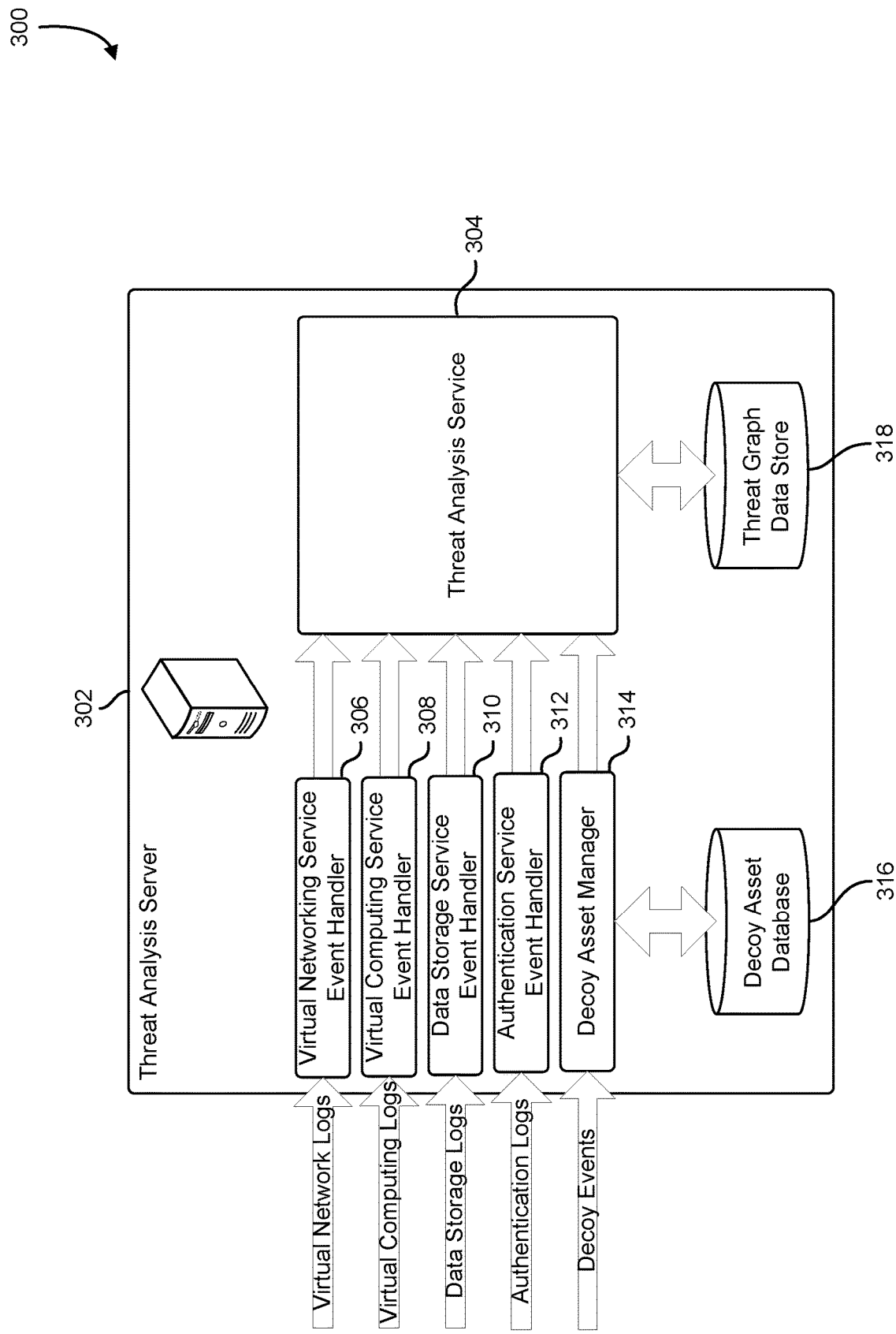
FIG. 3 shows an illustrative example of a threat analysis service, in accordance with an embodiment.

FIG. 3 shows an illustrative example of a threat analysis service, in accordance with an embodiment. A block diagram 300 illustrates a structure of a threat analysis server 302. The threat analysis server 302 is a computer system that includes a processor and memory. The memory retains executable instructions that, as a result of being executed, implement a threat analysis service 304, a virtual networking service event handler 306, a virtual computing service event handler 308, a data storage service event handler 310, an authentication service event handler 312, and a decoy asset manager 314. The threat analysis server 302 maintains a decoy asset database 316 threat graph data store 318 on a storage device accessible to the threat analysis server 302. In some examples, the storage device is nonvolatile memory, disk media, or optical media. In another example, the storage device is a storage service accessible to the threat analysis server 302, such as a network attached storage device or online data storage service. The threat analysis server 302 may be deployed into a customer environment by an administrator or by a management service operated by a computing resource service provider. In some implementations, the threat analysis server 302 is implemented as a virtual machine that is created by the computing resource service provider and connected to a virtual network allocated to the customer. In another implementation, the threat analysis server 302 is a network appliance, and the computing resource service provider configures a logical connection between the network appliance and a customer network.

The threat analysis service 304 acquires diagnostic information via the event handlers 306, 308, 310, and 312. The threat analysis service 304 parses the diagnostic information and produces a collection of events. Based at least in part on information provided by each event handler, the threat analysis service 304 determines a type for each event record. In one embodiment, the threat analysis service 304 categorizes the event records as trigger events, alert events, and normal events. Trigger events are events that indicate a potential system compromise, expansion of rights to a particular user, or modification or expansion of security policies. Alert events describe events that have the potential to jeopardize, corrupt, or compromise customer data or the customer environment itself. Normal events are operational events that do not indicate a potential compromise or represent a significant operational risk, but may indicate a connection between trigger events and alert events. For example, a particular trigger event may indicate that a password associated with a privileged user account has been reset. A normal record may indicate that the privileged user account was used to generate a new set of user credentials. An alert event may indicate that sensitive data has been exported from the customer environment using the new set of user credentials. In this particular example, the threat analysis service 304 determines the connection between the trigger event and the alert event using the normal event by noting that the compromised privileged user account was used to generate the new set of credentials, and the new set of credentials was used to access the sensitive data.

The event handlers 306, 308, 310, and 312 acquires diagnostic information relating to the operation of services and computer systems in the customer environment, and provide information to the threat analysis service 304 that allows the threat analysis service 304 to construct a corresponding set of event records. The virtual networking service event handler 306 harvests diagnostic information associated with the customer's virtual networks. In one example, the virtual networking service event handler 306 acquires event logs, trace logs, diagnostic logs, and other diagnostic information related to the operation of the customer environment by retrieving the logs from virtual networking appliances and virtual networking services that implement the customer virtual network. The virtual computing service event handler 308 harvests diagnostic information associated with virtual machines, container runtimes, and other virtual computing resources utilized by the customer. In one example, the virtual computing service event handler 308 acquires event logs, trace logs and diagnostic information from a virtual computing service for resources associated with the customer. The data storage service event handler 310 acquires event logs, trace logs, and other diagnostic information from data storage services and storage devices used by the customer. The authentication service event handler 312 acquires operational logs and operational history for user accounts and authentication operations associated with customer resources.

The decoy asset manager 314 manages the deployment of decoy computer systems, decoy data, and decoy networks within the customer environment. Information related to the decoy assets is stored in the decoy asset database 316. When the decoy asset manager 314 generates a new decoy asset, information describing the new decoy asset is stored in the decoy asset database 316. Using the information stored in the decoy asset database 316, the decoy asset manager 314 monitors the decoy assets deployed in the customer environment. The decoy asset manager 314 collects diagnostic information related to the deployed decoy entities, and provides the information to the threat analysis service 304.

In one embodiment, the decoy asset manager 314 deploys a decoy virtual server into the customer environment by creating the decoy virtual server, and connecting the decoy virtual server to a customer network. The decoy virtual server may be configured to be less secure than other customer computer systems. In some embodiments, the decoy asset manager 314 examines one or more computer systems in the customer environment, and configures the decoy virtual server to match the configuration of other customer computer systems. For example, the decoy asset manager 314 may choose a name similar to the names used to describe the customer computer systems. In another example, the decoy asset manager 314 may configure the decoy virtual server with an amount of memory, storage space, and processor capabilities similar to those of customer computer systems. In additional embodiments, the decoy asset manager 314 deploys decoy virtual networking devices, decoy virtual storage services, decoy Web servers, or other decoy services. Each decoy service may be configured based on the configuration of corresponding customer services. For example, a decoy Web server may be generated and configured in accordance with the configuration of a customer Web server. The decoy asset manager 314 monitors the deployed decoy assets and provides information to the threat analysis service 304 which allows the threat analysis service 304 to generate event records that represent operation of the decoy assets.

The event handlers 306, 308, 310, 312, and the decoy asset manager 314 provide information to the threat analysis service 304 that allows the threat analysis service to generate corresponding event records. The event records are arranged into a graph and stored in the threat graph data store 318. The graph links event records which share a matching characteristic such as a time at which the event occurred, a credential used to authorize the event, a system on which the event occurred, or a parameter associated with the event. In one embodiment, at a particular time, the threat analysis service 304 receives diagnostic information from the event handlers and the decoy asset manager 314 and produces a corresponding set of event records. Individual event records in the set of event records are linked to one another in the graph based on the fact that they occurred during at particular timespan. If a second set of diagnostic information is received at a later time, corresponding event records are linked to each other based on the characteristic that they occurred at the later time. If a subset of events are authorized using a particular credential, the corresponding individual event records in the subset of event records are linked to each other in the graph based on the characteristic of the matching authorizing credential.

Figure 4:
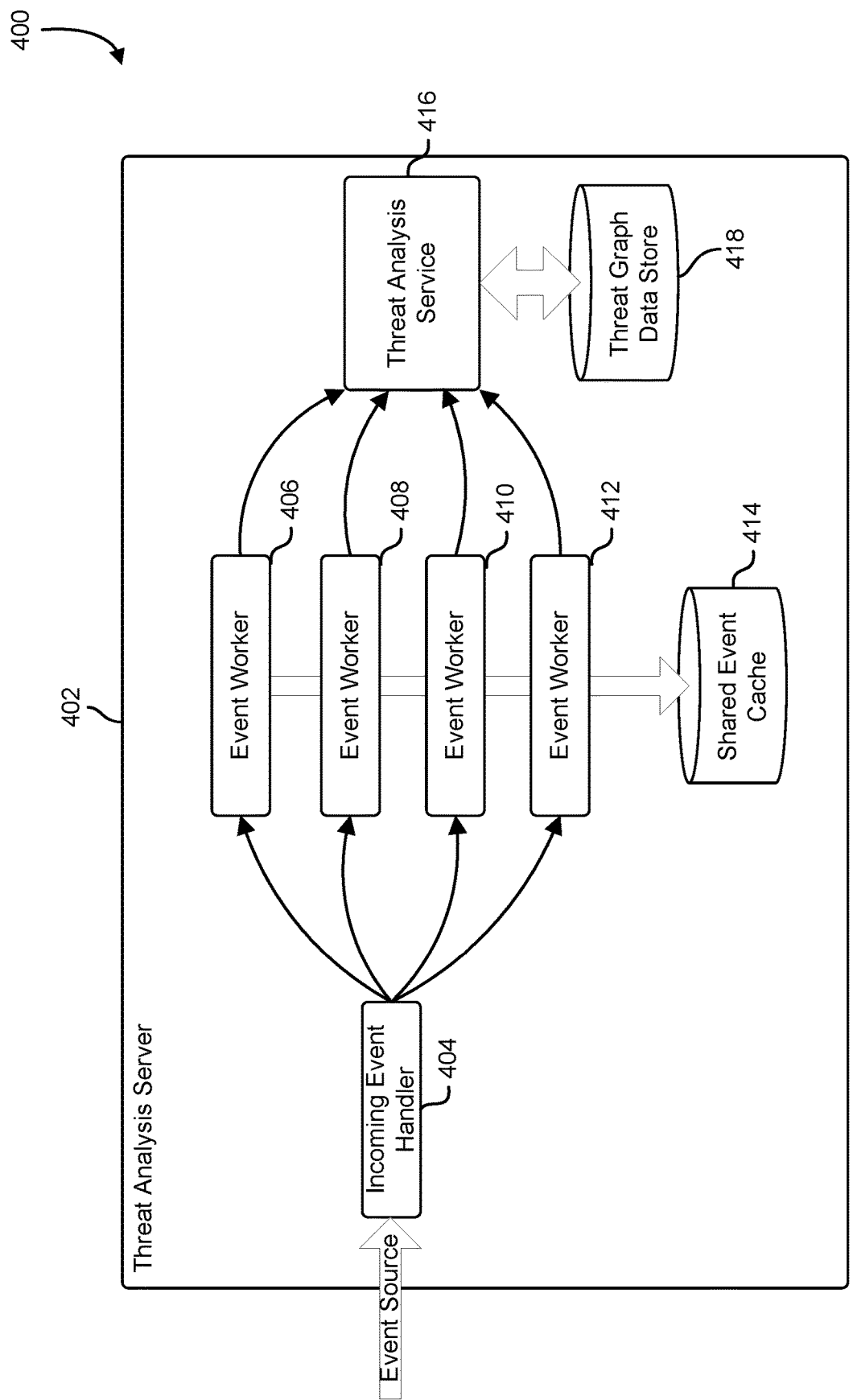
FIG. 4 shows an illustrative example of an event processing cache, in accordance with an embodiment.

FIG. 4 shows an illustrative example of an event processing cache, in accordance with an embodiment. A diagram 400 illustrates an example of a threat analysis server 402 that uses an event processing pipeline to improve the event processing capability of the threat analysis server. An incoming event handler 404 receives events from an event source such as an event log, trace file, or other source of diagnostic information. In various examples, the incoming event handler 404 may be a storage service event handler, a virtual networking event handler, a virtual processing event handler, or an authentication event handler.

As events are received by the incoming event handler 404, the incoming event handler 404 distributes the events to a plurality of event workers 406, 408, 410, and 412. The event workers 406, 408, 410, and 412, process the event by filtering duplicate events that have already been submitted to a threat analysis service 416. Each event worker 406, 408, 410, and 412 has access to a shared event cache 414 that is used to maintain a record of events that have already been sent to the threat analysis service 416. When an event worker received incoming event from the incoming event handler 404, the event worker opens the shared event cache 414 to see if a matching event has already been sent to the threat analysis service 416. In various implementations, an event is matching if it represents a relationship that matches another event. If the event worker determines that a matching event has already been sent to the threat analysis service 416, the incoming event is discarded. If the event worker determines that a matching event has not been sent to the threat analysis service 416, the incoming event is forwarded to the threat analysis service 416 and a copy of the incoming event is written to the shared event cache 414. In some implementations, the shared event cache 414 is implemented using a Bloom filter. In another implementation, the shared event cache 414 is implemented using a sparse hash table of bits, and the hash of the event relationship is written to the sparse hash table to indicate the presence of a matching event.

The shared event cache 414 may be implemented using memory, disk storage, or processor cache connected to the threat analysis server 402. In one implementation, the shared event cache 414 is configured to maintain a threshold maximum size. As events are added to the shared event cache 414, old events are deleted from the shared event cache 414 to make room for new events. In one implementation, the threat analysis service 416 generates a threat graph data store 418 containing a graph of events. If the threat analysis service 416 resets the information stored in the threat graph data store 418, the threat analysis service 416 sends a signal to the shared event cache 414 which causes the shared event cache 414 to delete the contents of the cache.

In various examples, by employing multiple event workers, and by identifying and discarding duplicate events using the shared event cache 414, the threat analysis server 402 is able to process large numbers of incoming events without overwhelming the threat analysis service 416 or the threat graph data store 418. In some implementations, the event workers 406, 408, 410, and 412, discard unnecessary events based on a set of rules provided by the threat analysis service 416. For example, certain types of events may not indicate any particular relationship of interest to the threat analysis service, so the threat analysis service 416 may provide rules which cause the event workers to discard such events.

Figure 5:
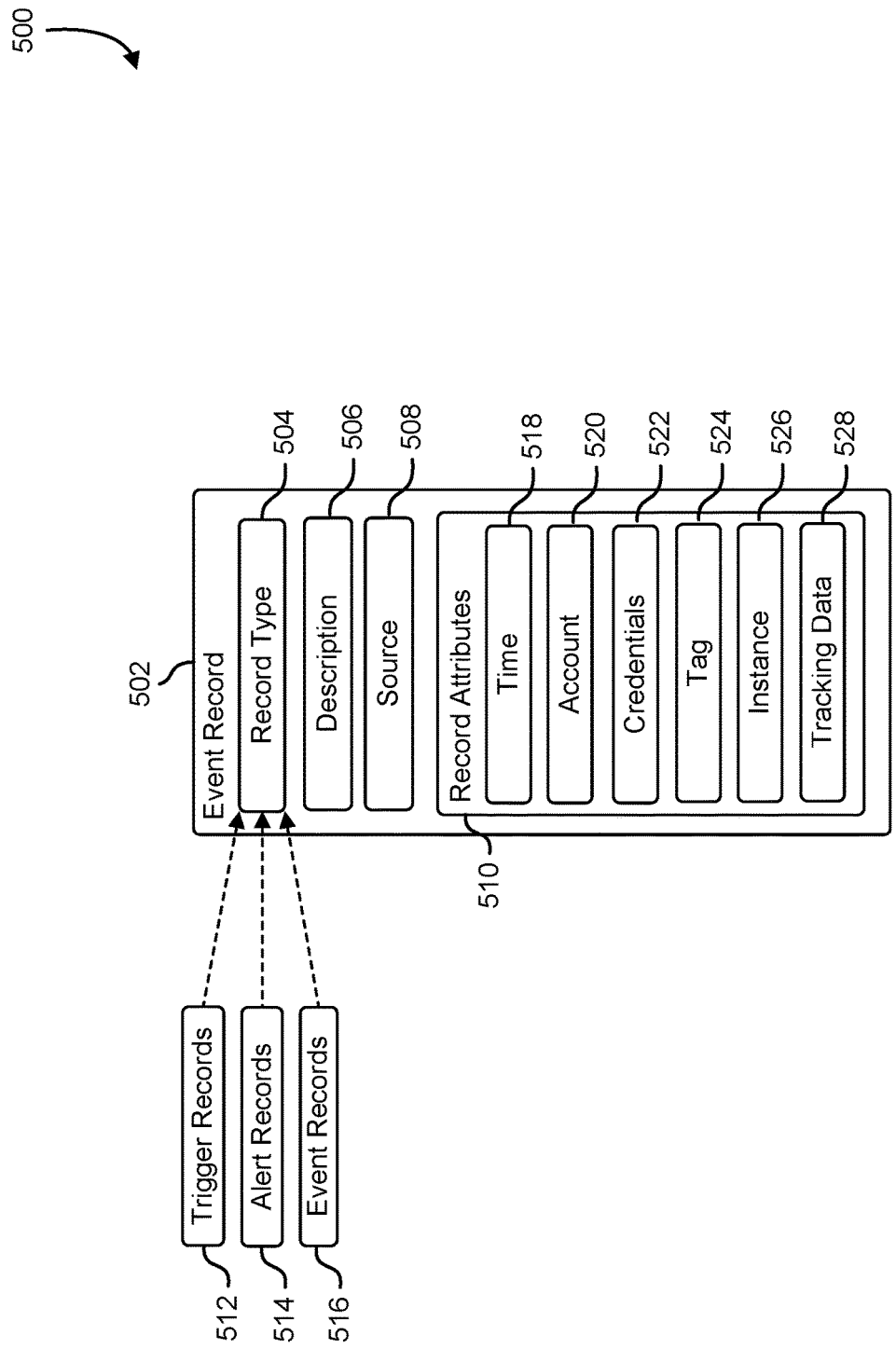
FIG. 5 shows an illustrative example of an event record produced by a threat analysis service, in accordance with an embodiment.

FIG. 5 shows an illustrative example of an event record produced by a threat analysis service, in accordance with an embodiment. A diagram 500 illustrates a record structure for an event record 502. The record structure may be used as a data arrangement for storing event records in a threat graph data store on a threat analysis server. The event record 502 includes a record type 504, a description field 506, a source field 508, and a set of record attributes 510. The record type 504 is an enumeration or description that identifies the type of the event field. In an embodiment, the record type 504 may include a trigger record value 512, an alert record value 514, or an event record value 516. The trigger record value 512 indicates that the event record 502 is a trigger type record that suggests compromise of the monitored computing environment. The alert record value 514 indicates that the event record 502 is an alert record that indicates potential harm to the monitored computing environment. The event record value 516 suggests that the event record 502 is an operational record that may connect other records in the graph. The description field 506 holds a description of the event record 502. In some implementations, the description field 506 holds a text description of the event record 502. In another implementation, the description field 506 holds an identifier that represents the description of the event record 502. The source field 508 identifies the source of the diagnostic information that was used by the threat analysis service to create the event record 502. In some examples, the source field 508 contains a network identifier such as a network name or IP address. In other examples, the source field 508 includes a service identifier such as a uniform resource locator ("URL").

The set of record attributes 510 contains a number of fields that describe characteristics of the event record 502. In the example shown in FIG. 5, the set of record attributes 510 includes a time field 518, an account field 520, a credentials field 522, a tag field 524, an instance field 526, and a tracking data field 528. The time field 518 stores a time at which the event associated with the event record 502 occurred. The account field 520 describes an account affected by or authorizing the event associated with the event record 502. The credentials field 522 identifies the credentials used to authorize the event associated with the event record 502. The tag field 524 identifies a particular data or parameters used by the event associated with the event record 502. The instance field 526 describes a virtual machine instance, runtime, or other virtual computing resource that originated the event associated with the event record 502. The tracking data field 528 identifies tracking data impacted by or acted upon by the event associated with the event record 502. In various implementations, additional attributes may be added to the set of record attributes 510 based on diagnostic information provided to the threat analysis service when the event record 502 is created. The threat analysis service uses the set of record attributes 510 to link various event records having matching fields in the graph.

Figure 6:
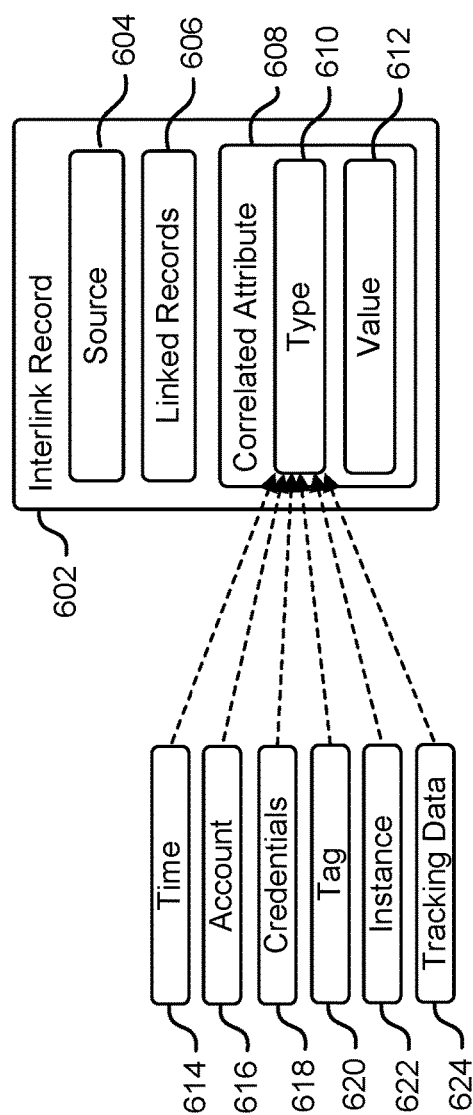
FIG. 6 shows an illustrative example of an interlink record used to store connections between event records, in accordance with an embodiment.

FIG. 6 shows an illustrative example of an interlink record used to store connections between event records, in accordance with an embodiment. A diagram 600 illustrates a record structure for an interlink record 602. The record structure may be used as a data arrangement for linking event records in a threat graph data store on a threat analysis server. The interlink record 602 includes a source field 604, a set of linked records 606, and a correlated attribute record 608. The source field 604 contains information that identifies a source event record, such as a trigger type event record, that caused the threat analysis service to generate the interlink record 602. For example, in the case of a trigger record, a particular attribute of the trigger record becomes the correlated attribute of the interlink record 602. The set of linked records 606 identifies a set of event records having an attribute that matches the attribute specified in the correlated attribute record 608. The set of event records may be identified using a list of identifiers, a set of pointers, or other structure capable of identifying a set of event records.

The correlated attribute record 608 identifies a particular attribute and a particular attribute shared by the set of linked records 606. The correlated attribute record 608 includes an attribute type field 610 and an attribute value field 612. The attribute type field identifies the type of attribute shared by the event records indicated by the set of linked records 606. In some implementations, the attribute type field 610 is an enumeration that may have a time value 614, an account value 616, a credential value 618, a tag value 620, an instance value 622, and a tracking data value 624. The various values that may be assigned to the attribute type field 610 are correlated to the types of record attributes shown in FIG. 5. The attribute value field 612 is a data field that holds the value to be matched. The type of the attribute value field 612 is based at least in part on the value of the attribute type field 610. In some implementations, when the interlink record 602 is created, the threat analysis service retrieves the value of an attribute from the event record specified in the source field 604 and stores the value in the attribute value field 612. The particular attribute retrieved from the event record is identified in the attribute type field 610. For a particular trigger record, more than one interlink record 602 may be generated. For example, an interlink record may be generated for each attribute of the particular trigger record.

Figure 7:
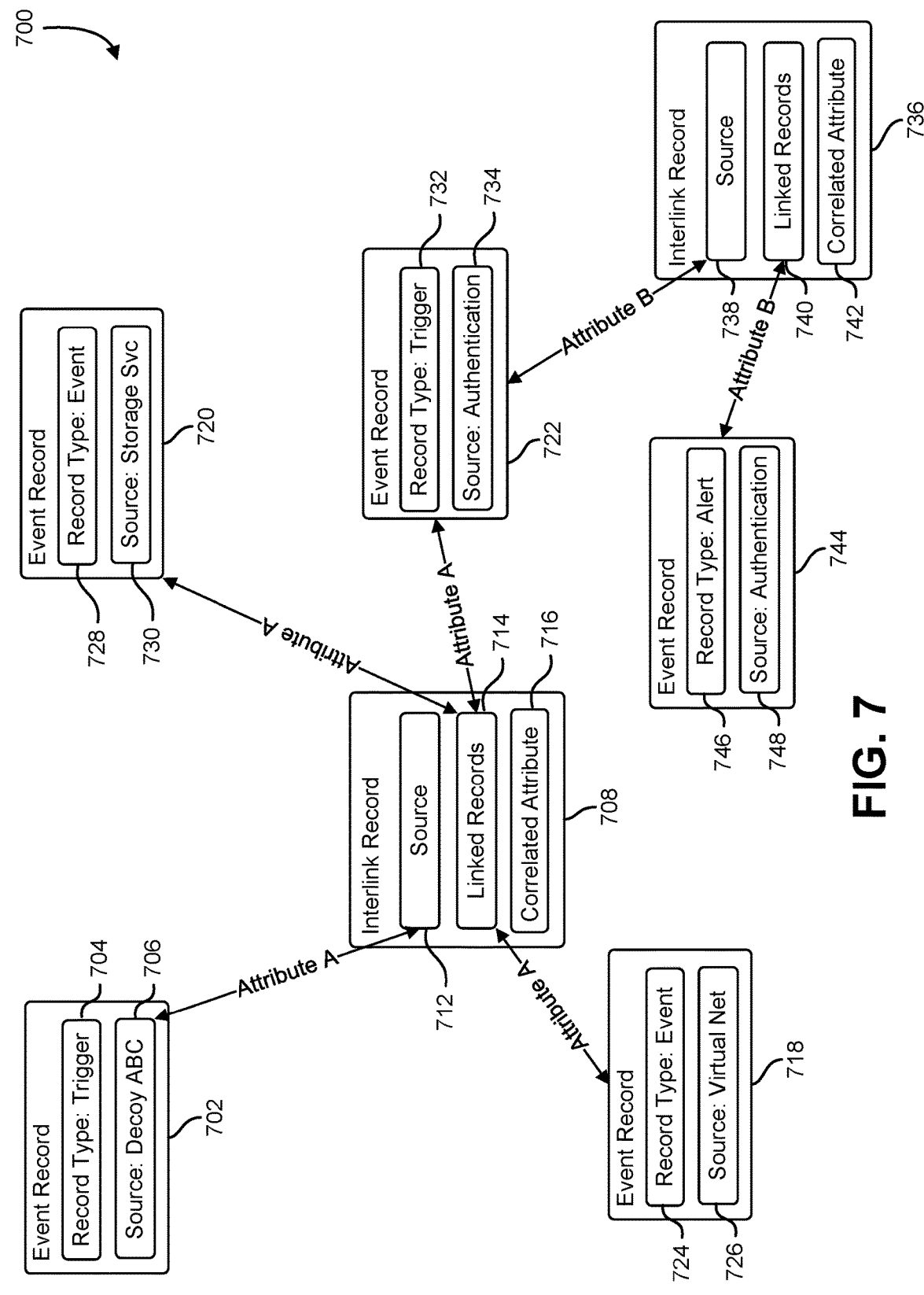
FIG. 7 shows an illustrative example of a graph of event records, in accordance with an embodiment.

FIG. 7 shows an illustrative example of a graph of event records, in accordance with an embodiment. A data diagram 700 illustrates an example of a graph of event records linked together with interlink records. The graph includes a first event record 702. The first event record 702 includes a trigger record type field 704 that identifies the first event record as a trigger type event record. The first event record 702 includes a source field 706 that identifies the source of the event associated with the first event record 702 as a decoy resource named "ABC."

A first interlink record 708 is linked to the first event record 702 via a source field 712. The source field may contain a pointer or identifier associated with the first event record 702. The first interlink record 708 includes a set of linked records 714 and a correlated attribute record 716. The correlated attribute record 716 identifies an attribute type and the value possessed by the first event record 702. The set of linked records 714 identifies those records that share the attribute identified in the correlated attribute record 716. In the example shown in FIG. 7, the set of linked records 714 identifies a second event record 718, a third event record 720, and a fourth event record 722. The second event record 718 includes a record type field 724 that identifies the second event record as a normal event type, and a source field 726 that identifies the second event record 718 as originating from an event that occurred on a particular virtual network. The third event record 720 includes a record type field 728 that identifies the third event record as a normal event type, and a source field 730 that identifies the third event record 720 as originating from an event that originated from a particular data storage service. The fourth event record 722 includes a record type field 732 that identifies the fourth event record as a trigger event type, and a source field 734 that identifies the fourth event record 722 as originating from an event that originated from an authentication service.

In the example shown in FIG. 7, the first event record 702, the second event record 718, the third event record 720, and the fourth event record 722 share a matching attribute identified in the correlated attribute record 716 in the first interlink record 708. In some implementations, attributes are matching when they have the same value. In another implementation, attributes are matching when the value of the attribute specified in the interlink record is approximately the same value. For example, an administrator of a threat analysis service may configure a time span during which events are considered to have occurred with a likely amount of correlation. A specific time may be identified in the first interlink record 708, and event records having a time attribute within the configured time span of the time specified in the first interlink record 708 are considered to have matching time attributes.

A second interlink record 736 links the fourth event record 722 and a fifth event record 744. The second interlink record 736 includes a source field 738 that identifies the fourth event record 722, a set of linked records 740, and a correlated attribute record 742. The correlated attribute record 742 is assigned a value by the threat analysis service that matches an attribute of the fourth event record 722. The set of linked records 740 includes a fifth event record 744 which has an attribute that matches the correlated attribute record 742. The fifth event record 744 has a record type field 746 that indicates that the fifth event record 744 is an alert type record and a source field 748 that indicates that the fifth event record 744 originated from an authentication service.

Using the graph illustrated in FIG. 7, the threat analysis service is able to determine various connections between events. For example, the threat analysis service can identify that the first event record 702 is connected to the fifth event record 744 via the fourth event record 722. By identifying such connections and the shared attributes of the linked event records, the threat analysis service is able to detect potential system compromises that are comprised of events originating from different streams of diagnostic information.

In some examples, the threat analysis service uses various characteristics of the graph to determine that a security event has occurred. In some implementations, the threat analysis service uses the size of the graph to determine that a security event has occurred. In additional implementations, the threat analysis service tracks the growth of the graph over time, and based on the rate of growth, determines whether a security event has occurred. In another implementation, the threat analysis service maintains a set of rules that are applied to the graph, and when a particular rule is satisfied, the threat analysis service determines that a security event has occurred.

Figure 8:
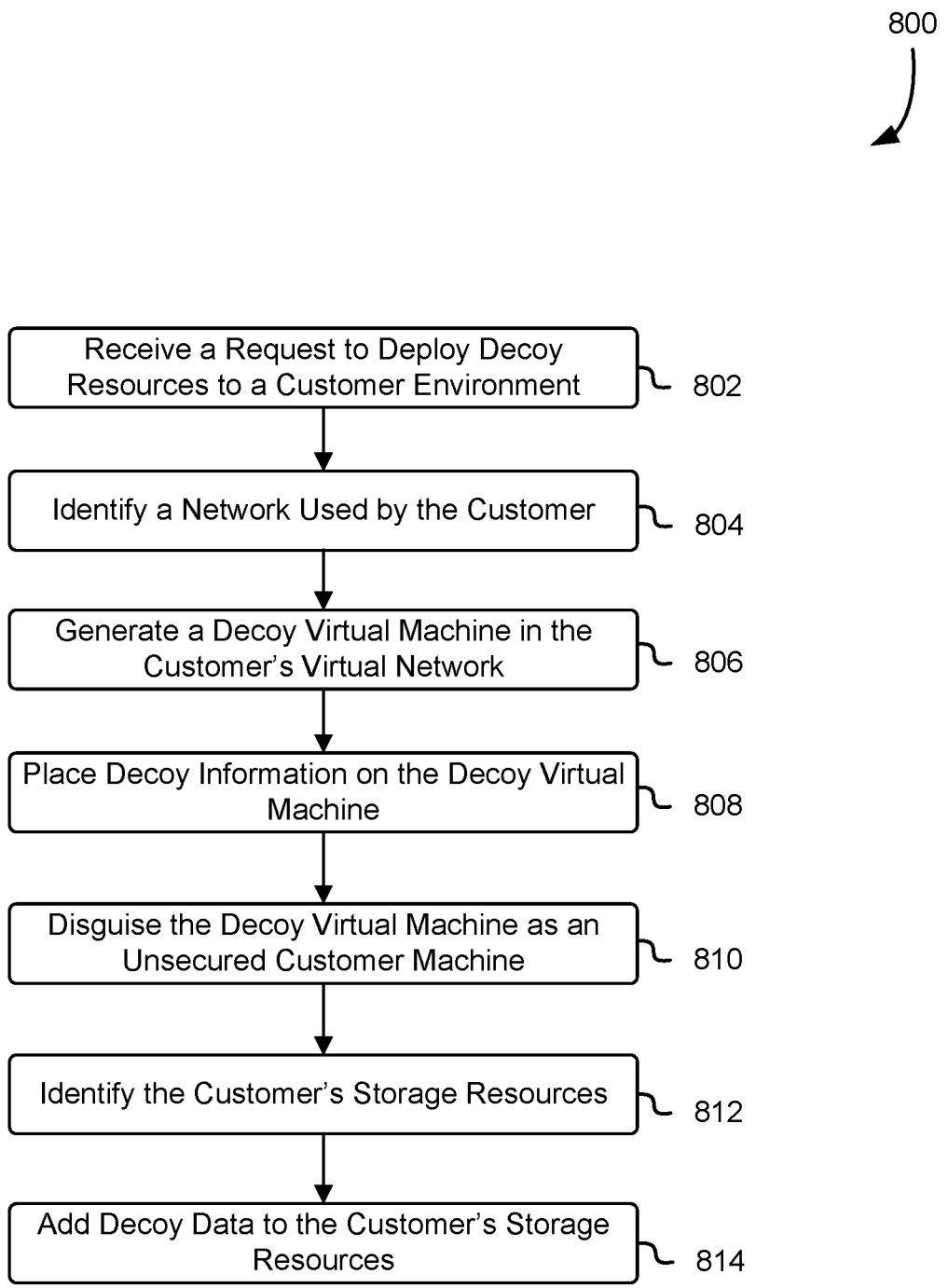
FIG. 8 shows an illustrative example of a process that, when performed by a threat analysis server, deploys decoy elements into a customer environment, in accordance with an embodiment.

FIG. 8 shows an illustrative example of a process that, when performed by a threat analysis server, deploys decoy elements into a customer environment, in accordance with an embodiment. A flowchart 800 illustrates a process that begins at block 802 with a threat analysis service receiving a request to deploy decoy resources to a customer environment. The decoy resources may include processing resources, storage resources, or decoy data on existing computing and storage resources. In some examples, the request is submitted by a customer administrator to the threat analysis service. In another example, a customer subscribes to a threat analysis service provided by a computing resource service provider, and an administrator of the computing resource service provider sends the request to a threat analysis service running on a threat analysis server allocated to monitoring the customer's computing environment.

At block 804, the threat analysis service collects information describing the customer's computing environment. The information describing the customer's computing environment may include descriptions of virtual networks allocated to the customer, virtual machines operating in the customer's virtual networks, services used by the customer, and other networks, computing devices, computer servers, storage devices, and databases used by the customer. In some examples, the information describing the customer's computing environment describes the systems, networks, peripherals, and services operating in a data center allocated to the customer. The threat analysis service analyzes the information to identify a computer network used by the customer.

At block 806, the threat analysis service generates a decoy virtual machine and connects the decoy virtual machine to the customer's network. The customer's network may be a subnet allocated to the customer, a virtual network allocated to the customer, or a protected internal network used by the customer. In some implementations, the threat analysis service generates a virtual private network ("VPN") connection to an internal network used by the customer and connects the decoy virtual machine to the internal network via the VPN connection. In another implementation, the threat analysis service connects the decoy virtual machine to a virtual network used by the customer. The decoy virtual machine may be connected to the network by configuring network parameters of the decoy virtual machine in accordance with the operational parameters of the customer network, and by configuring intermediary network appliances such as routers and firewalls to route network traffic between the decoy virtual machine in the customer network. The decoy virtual machine may be generated using a hypervisor, container runtime, or other virtual computing service. The threat analysis service may record information describing the configuration of the decoy virtual machine in a decoy asset database.

At block 808, the threat analysis service places decoy information on the decoy virtual machine. The decoy information may include decoy credentials, decoy cryptographic keys, tracking data, decoy cookies, decoy false business information, or other data designed to lure, attract, or allow for the tracking of an attacker's activities. In some examples, the decoy information includes one or more records in a database used by the customer. In another example, the decoy information includes a cryptographic key used by the customer. In yet another example, the decoy information includes a private cryptographic key that appears to correspond to a public cryptographic key used by the customer. The decoy information may be stored on a storage volume, in memory, or even a remote storage service that is available to the decoy virtual machine.

At block 810, the threat analysis service disguises the decoy virtual machine to appear as a relatively unsecured computer system operated by the customer. In some implementations, the threat analysis service analyzes customer computer systems on the customer network to identify computer names, configurations, and resource profiles typically used by the customer, and configures the decoy virtual machine in accordance with the names, configurations and resource profiles used by the customer. In one example, the threat analysis service identifies a common prefix used to name customer computer systems, and applies a matching prefix to the name of the decoy virtual computer system. In another example, the threat analysis service identifies a resource configuration used by customer virtual machines and uses a matching resource configuration for the decoy virtual computer system.

At block 812, the threat analysis service identifies data storage resources present in the customer environment. At block 814, the threat analysis service deploys decoy data to the identified data storage resources. The decoy data deployed to a particular storage resource is based at least in part on the characteristics of the storage resource. In one example, the threat analysis service determines that the storage resource is a database, and queries the schema of the database. Decoy data records and decoy data tables are added to the database that conforms to the identified schema.

In another example, the threat analysis service determines that an online storage volume contains multimedia information and, as a result, generates decoy multimedia information that is added to the online storage volume. In yet another example, the threat analysis service identifies a cryptographic key server holding cryptographic keys used by the customer and adds decoy cryptographic keys to the cryptographic key server.

In various embodiments, decoy computing resources and decoy data are monitored by the threat analysis service and improve the likelihood of detecting system intrusions. For example, decoy data placed on a first customer system may be detected on another customer system even when access of the decoy data on the first customer system goes undetected.

Figure 9:
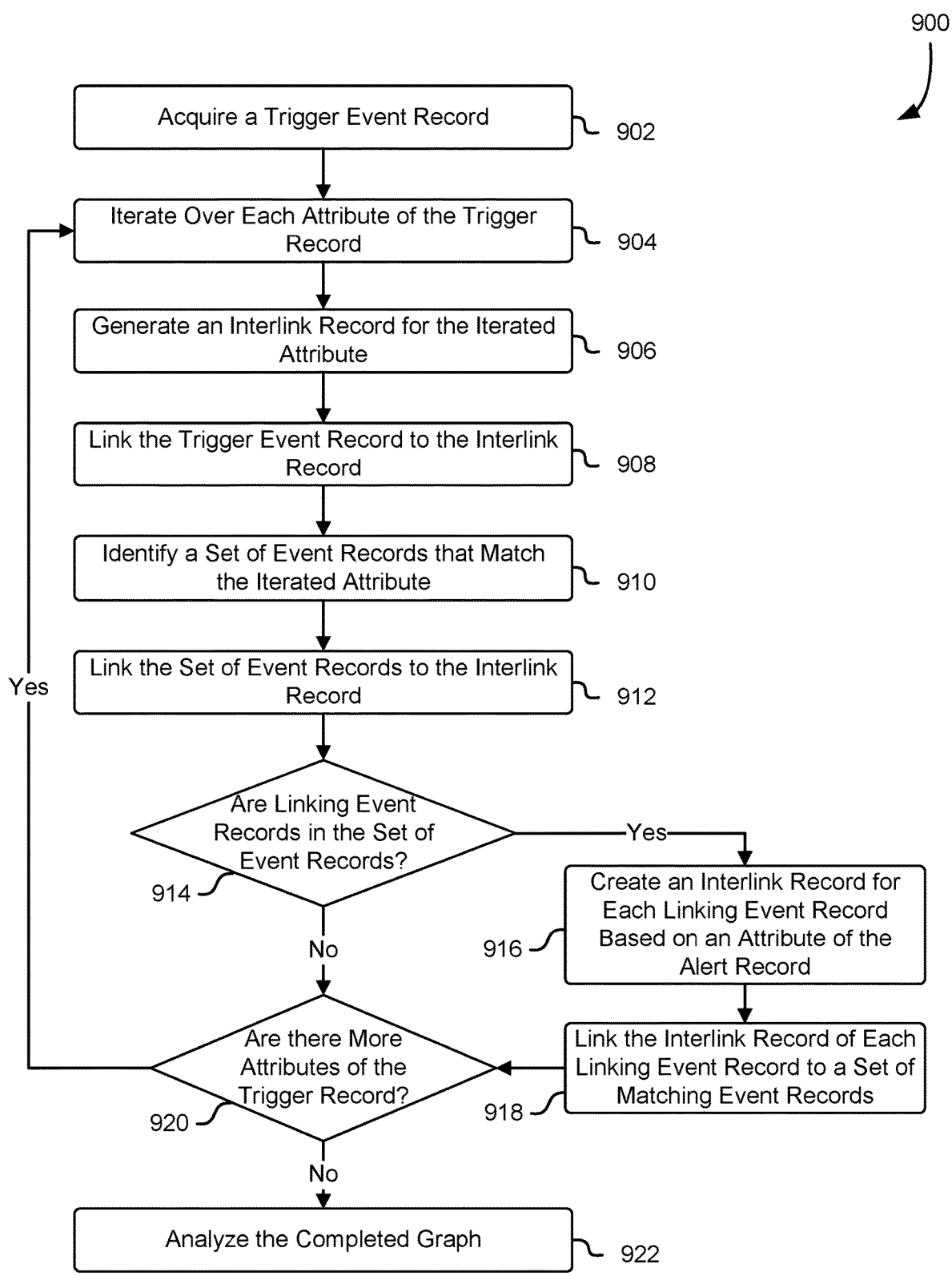
FIG. 9 shows an illustrative example of a process that, when performed by a threat analysis server, builds a graph of event records, in accordance with an embodiment.

FIG. 9 shows an illustrative example of a process that, when performed by a threat analysis server, builds a graph of event records, in accordance with an embodiment. A flowchart 900 illustrates a process that begins at block 902 with the threat analysis service generating or acquiring a trigger event record. In various examples, a trigger event record describes an event that indicates a system compromise or a potential system compromise. Examples of a trigger event may include a password reset operation, execution of privileged commands, or accessing a decoy resource deployed by the threat analysis service.

At block 904, the threat analysis service iterates over the attributes of the trigger record. In various implementations, attributes of the trigger record may include the time of an associated event, the credentials used to authorize the event, or the identity of a virtual computer system instance on which the event was generated. At block 906, the threat analysis service generates an interlink record for the iterated attribute. The interlink record identifies the iterated attribute and the value of the iterated attribute for the trigger record. The interlink record may be stored in a threat graph data store accessible to the threat analysis service. At block 908, the threat analysis service links the trigger event record to the interlink record. In some examples, the interlink record is recorded as the source of the interlink record. At block 910, the threat analysis service searches the event records received by the threat analysis system and identifies a set of event records that match the iterated attribute. Each event record in the set of event records is linked 912 to the interlink record.

At decision block 914, the threat analysis service examines the set of event records and determines whether one or more linking event records are present in the set of event records. In various examples, linking event records are associated with events that have the potential to spread a compromise to another system or service in the customer network. Examples of a linking event record are creation of the new user account, changing permissions on a file, or authorizing access to a service. If a linking event record is present in the set of records, execution advances to block 916 and the threat analysis service creates an interlink record for each attribute of each linking event record. The attribute record of each interlink record is set to a type and value corresponding to the respective attribute of the linking event record. At block 918, the threat analysis server locates, for each interlink record, a set of event records that matches at least one attribute of the interlink record, and links each event record in the set of records to the interlink record. In some implementations, the threat analysis service iterates the above process of looking for additional linking event records, creating new interlink records, and linking still more event records. In various implementations, a fixed number of iterations is performed. In some implementations, the process is iterated until no linking event records are found. If, at decision block 914, the threat analysis service does not find any linking event records in the set of event records, execution advances to decision block 920.

At decision block 920, the threat analysis service determines whether there are more attributes of the trigger record iterated at block 904. If there are additional attributes of the trigger record, execution returns to block 904 and the next attribute is processed. If there are no additional attributes to be processed, execution advances to block 922. At block 922, the threat analysis service is able to analyze the graph and determine whether the trigger event associated with the trigger event record was associated with potential harm to the system. In some examples, the threat analysis service examines the resulting graph and determines if there is a path from the trigger event record to an alert record. In determining whether the path represents an anomaly or system compromise, the threat analysis service may examine the length of the path, any additional alert events or trigger events in the graph, and the severity of the events in the graph.

Figure 10:
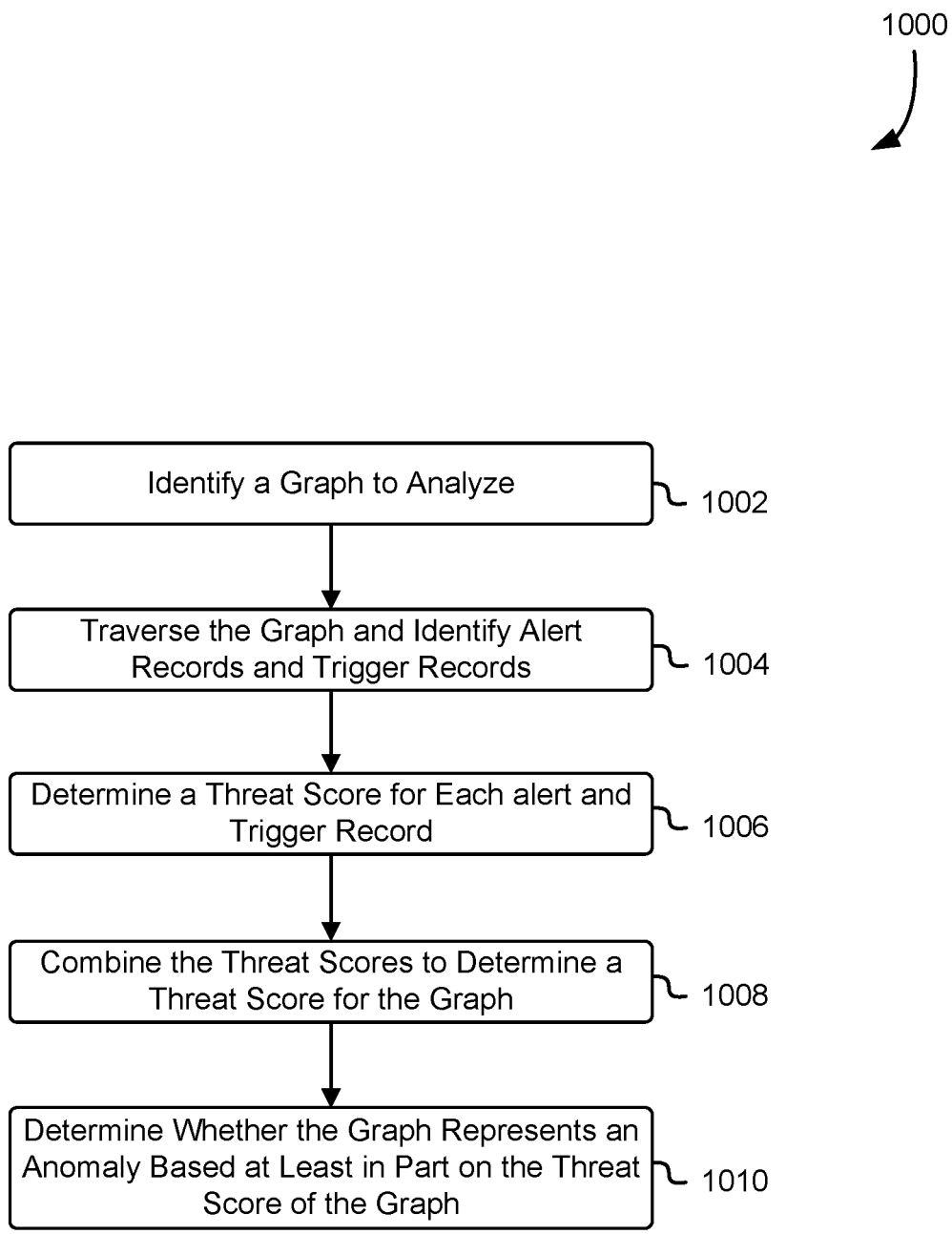
FIG. 10 shows an illustrative example of a process that analyzes a graph to identify important security events, in accordance with an embodiment.

FIG. 10 shows an illustrative example of a process that analyzes a graph to identify important security events, in accordance with an embodiment. A flowchart 1000 illustrates a process that begins at block 1002 with the threat analysis service identifying a graph of event records to be analyzed. In some examples, the graph is identified by identifying a particular trigger record which is indicative of a system compromise. In other examples, the graph is identified by identifying a particular alert record that is associated with potential system harm. In various embodiments, the threat analysis service attempts to associate indications of potential system compromise with indications of potential system harm based at least in part on characteristics of the graph. At block 1004, the threat analysis service traverses the graph and identifies alert records and trigger records. At block 1006, the threat analysis service determines a score for each alert record and each trigger record. For each trigger record, the threat analysis service determines a score representing the level of potential compromise of the computing environment. For each alert record, the threat analysis service determines a score representing the degree of damage caused to the computing environment or customer data. In determining a score for the trigger and alert records, the threat analysis service may consider the amount of data affected, and whether data is encrypted, exfiltration, or deleted.

At block 1008, the threat analysis service combines the scores of the trigger records and the alert records to generate a combined threat score for the graph. Using the scores assigned to the trigger records and alert records, the threat analysis service determines 1010 whether the graph represents an anomaly that should be reported to the customer. In some examples, the threat analysis service adds the scores associated with the alert records to create a combined alert score. If the combined alert scores greater than a threshold value set by a customer administrator, the threat analysis service examines the scores of the trigger records and identifies a particular trigger record having the highest score. If the highest score is greater than a threshold value set by the customer administrator, the graph is determined to indicate that a compromise of the customer environment caused significant harm. As a result, the threat analysis service notifies the customer of the anomaly and, in some embodiments, identifies the triggering event and the harm caused.

Figure 11:
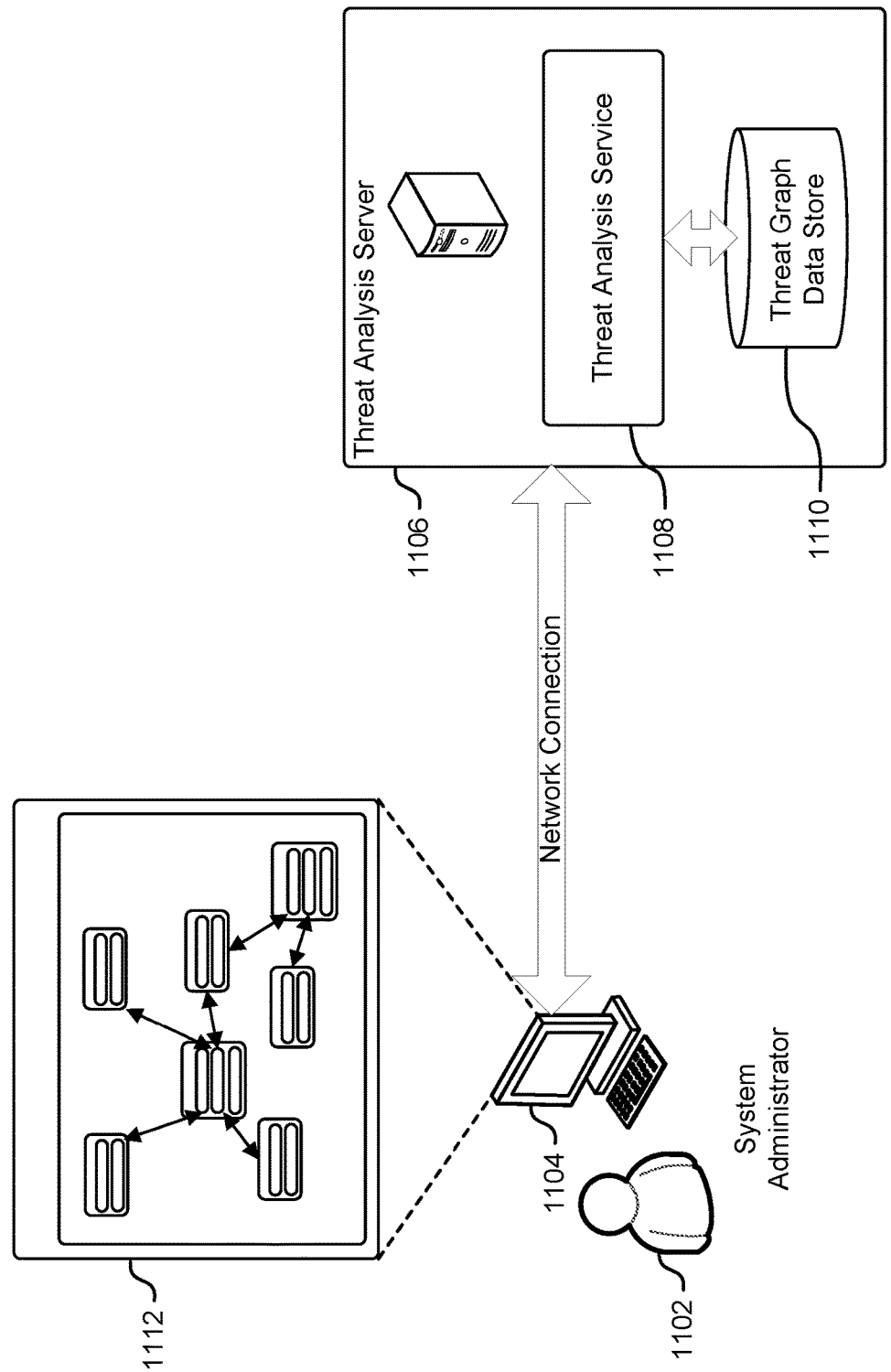
FIG. 11 shows an illustrative example of an administrative console that presents security information to an administrator, in accordance with an embodiment.

FIG. 11 shows an illustrative example of an administrative console that presents security information to an administrator, in accordance with an embodiment. A diagram 1100 illustrates a system that allows a system administrator 1102 to use a client computer system 1104 to interact with the threat analysis server 1106. In various examples, the client computer system 1104 is a client computer system running a web browser or other client software. The client computer system 1104 is connected to a computer network and establishes a network connection to the threat analysis server 1106. The threat analysis server 1106 hosts a threat analysis service 1108. The threat analysis service collects diagnostic information from a variety of computer systems, services, and other entities in a customer environment to produce event records and graphs that are maintained in a threat graph data store 1110.

The threat analysis service 1108 analyzes the information in the threat graph data store 1110 to identify anomalies such as security breaches that involve events that originate across a variety of computing entities in the customer environment. When the system administrator 1102 connects to the threat analysis server 1106 via the client computer system 1104, the threat analysis server 1106 sends display instructions to the client computer system that produces the user interface 1112 on the client computer system 1104. In one embodiment, the display instructions are hypertext markup language ("HTML,") instructions which are received and interpreted by a browser on the client computer system 1104.

In some embodiments, the user interface 1112 is a graphical user interface that presents a visual representation of the graph stored in the threat graph data store 1110. Using the graphical user interface, the system administrator 1102 is visually presented with a connection between triggering events and alert events, allowing further analysis to be performed by the system administrator 1102 to confirm the presence of the security breach. By presenting such information to the system administrator 1102, system-wide anomalies are more understandable and manageable because the user interface 1112 presents events from multiple systems and services in a single connected way.

In some examples, the threat analysis service 1108 produces an action to counteract a detected anomaly. In some implementations, the action is based at least in part on the event records in the graph. In one implementation, the threat analysis service identifies a path between a trigger event and an alert event in the graph, and identifies a credential used to authorize one or more events represented by a node in the path. The threat analysis service may revoke the credential, or reduce the permissions associated with the credential to secure the customer network.

In some examples, and administrator uses the user interface to configure operational parameters of the threat analysis service. The administrator may use the user interface to configure rules for analyzing an event graph, thresholds, parameters, or filters used for processing incoming events. In some examples, the administrator uses the user interface to configure caching system used to manage system performance when processing large numbers of incoming event streams.

Figure 12:
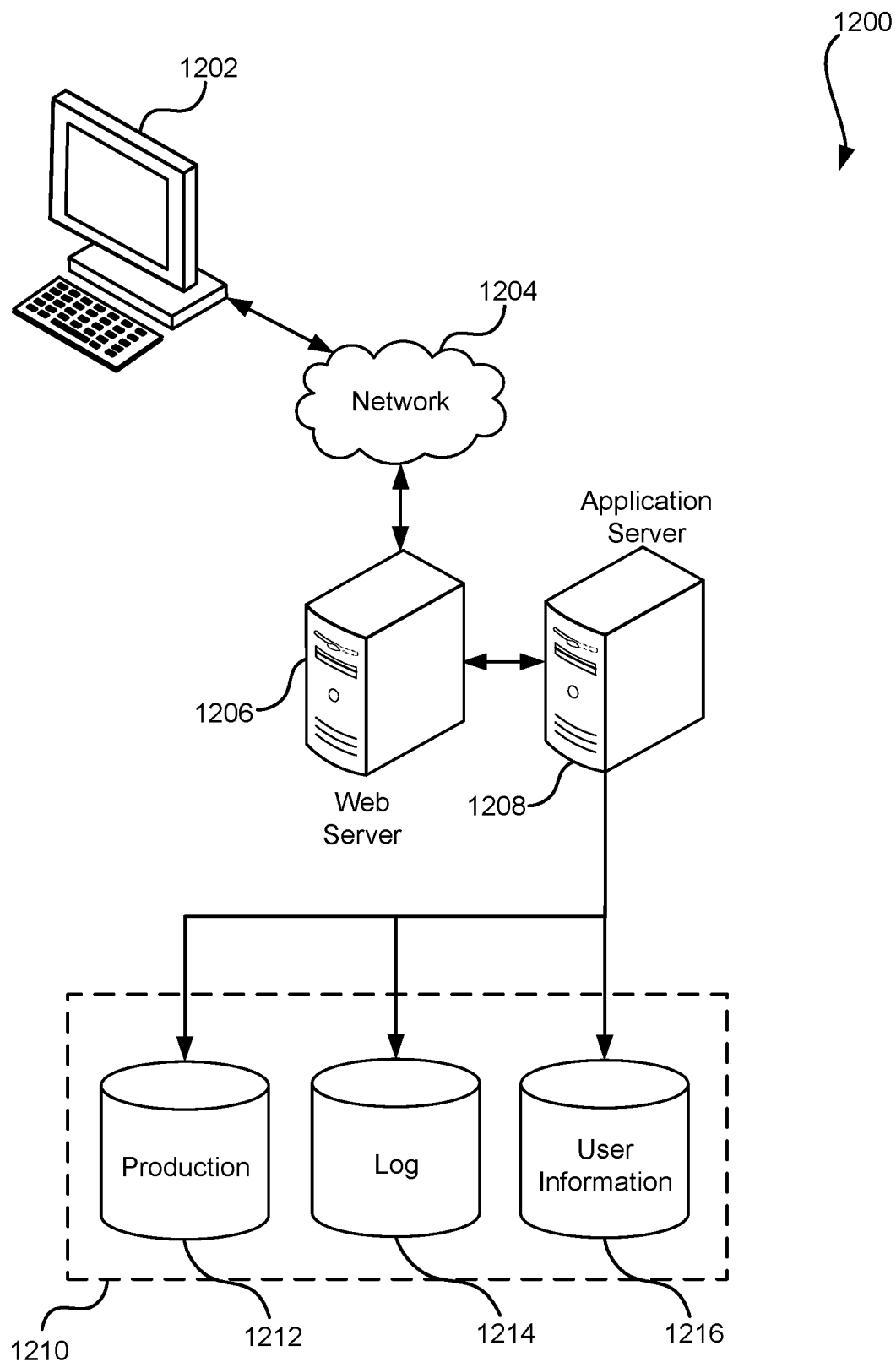
FIG. 12 illustrates an environment in which various embodiments can be implemented.

FIG. 12 illustrates aspects of an example environment 1200 for implementing aspects in accordance with various embodiments. As will be appreciated, although a web-based environment is used for purposes of explanation, different environments may be used, as appropriate, to implement various embodiments. The environment includes an electronic client device 1202, which can include any appropriate device operable to send and/or receive requests, messages, or information over an appropriate network 1204 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly addressable communications network, as the environment includes a web server 1206 for receiving requests and serving content in response thereto, although for other networks an alternative device serving a similar purpose could be used as would be apparent to one of ordinary skill in the art.

The illustrative environment includes at least one application server 1208 and a data store 1210. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing, and retrieving data, which may include any combination and number of data servers, databases, data storage devices and data storage media, in any standard, distributed, virtual, or clustered environment. The application server can include any appropriate hardware, software, and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the user audibly, visually, and/or through other senses. The handling of all requests and responses, as well as the delivery of content between the client device 1202 and the application server 1208, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 1210 can include several separate data tables, databases, data documents, dynamic data storage schemes, and/or other data storage mechanisms and media for storing data relating to a particular aspect of the present disclosure. For example, the data store illustrated may include mechanisms for storing production data 1212 and user information 1216, which can be used to serve content for the production side. The data store also is shown to include a mechanism for storing log data 1214, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 1210. The data store 1210 is operable, through logic associated therewith, to receive instructions from the application server 1208 and obtain, update or otherwise process data in response thereto. The application server 1208 may provide static, dynamic, or a combination of static and dynamic data in response to the received instructions. Dynamic data, such as data used in web logs (blogs), shopping applications, news services, and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the client device 1202. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 12. Thus, the depiction of the system 1200 in FIG. 12 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of computers, such as desktop, laptop or tablet computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGP") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C#, or C++, or any scripting language, such as Ruby, PHP, Perl, Python, or TCL, as well as combinations thereof. The server(s) may also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad) and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. In addition, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some examples, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   collecting diagnostic information from a plurality of customer computing resources;
   generating event records from the diagnostic information, each event record describing a set of attributes of a corresponding event produced by a customer computing resource;
   generating a graph of correlated event records where individual event records are represented by individual nodes of the graph and each edge of the graph links a pair of event records by a matching attribute;
   using the graph to identify a link between event records associated with different customer computing resources of different service types; and
   detecting a security event in the plurality of computing resources based at least in part on the link between the event records.

2. The computer-implemented method of claim 1, wherein collecting the diagnostic information is accomplished at least in part by retrieving log entries from a log file, acquiring event records from an event logging service, or reading a trace file produced by a computer system.

3. The computer-implemented method of claim 1, further comprising deploying a decoy computing resource into a customer computing environment that includes the customer computing resources.

4. The computer-implemented method of claim 3, further comprising:
   configuring a virtual machine instance based at least in part on the configuration of the customer computing resources;
   connecting the virtual machine instance to a computer network connected to the customer computing resources; and
   generating additional event records using diagnostic information generated by the virtual machine instance.

5. A system, comprising:
   one or more processors; and
   memory storing computer-executable instructions that, if executed by the one or more processors, cause the system to:
     generate a graph of event records, the event records describing events in a computing system, individual event records represented by individual nodes of the graph, and each edge of the graph links a pair of event records by a matching attribute;
     identify a path between a pair of records in the graph, the path including one or more links in the graph, the pair of records associated with events produced by different service types;
     identify an anomaly in operation of the computing system based at least in part on the path between the pair of records in the graph; and
     indicate the anomaly.

6. The system of claim 5, wherein:
   the graph of event records is stored as a data structure in data memory accessible to the one or more processors;
   the graph identifies at least one event record as representing a compromise of the computing system; and
   the graph identifies at least one event record as representing an action that is potentially harmful to the computing system.

7. The system of claim 5, wherein identifying an anomaly is accomplished at least in part by:
   determining that the graph includes a first event record that represents a compromise of the computing system;

determining that the graph includes a second event record that represents potential harm; and determining, based at least in part on information in the graph of event records, that there is a path between the first event record and the second event record.

8. The system of claim 5, wherein the computer-executable instructions further cause the system to:
deploy a decoy resource into an environment shared with the computing system;
unsecure the decoy resource;
generate a new event record as a result of detecting an interaction with the decoy resource; and
add the new event record to the graph.

9. The system of claim 8, wherein:
the decoy resource is a decoy computer system that retains a credential; and
the interaction is an attempted use of the credential.

10. The system of claim 8, wherein:
the decoy resource is a file on a customer file system maintained by the computing system; and
the interaction is an attempted access of the file.

11. The system of claim 8, wherein:
the decoy resource is a virtual network generated by the system; and
the interaction is an attempt to establish a connection to an entity within the virtual network.

12. The system of claim 8, wherein:
the decoy resource is a data record on a customer database used by the computing system; and
the interaction is the execution of a database command that attempts to access the data record.

13. A non-transitory computer-readable storage medium storing executable instructions that, as a result of being executed by one or more processors of a computer system, cause the computer system to at least:
generate a graph of event records, the event records describing events in a customer computer system, the graph including links between event records with a matching characteristic;
identify a correlation between a first record in the graph and a second record in the graph, the correlation represented by a set of links in the graph, the first record and the second record associated with events produced by different service types; and
identify an anomaly in operation of the customer computer system based at least in part on the correlation.

14. The non-transitory computer-readable storage medium of claim 13, wherein:
the graph includes a first graph portion that includes a first set of records that share a first characteristic;
the graph includes a second graph portion that includes a second set of records that share a second characteristic;
the first record in the first set of records and a second record in the second set of records share a third characteristic; and
the first graph portion and the second graph portion are linked by the first record and the second record.

15. The non-transitory computer-readable storage medium of claim 13, wherein:
the event records are acquired by the computer system from a plurality of customer computing systems connected to a customer network; and
the event records describe events that are generated by the plurality of computing systems.

16. The non-transitory computer-readable storage medium of claim 13, wherein the matching characteristic of the event records is a user credential used to generate events corresponding to the event records.

17. The non-transitory computer-readable storage medium of claim 13, wherein:
the matching characteristic of the event records is a time span during which the events corresponding to the event records occurred; and
the time span including a range that indicates that the events corresponding to the event records are correlated.

18. The non-transitory computer-readable storage medium of claim 13, wherein the instructions further comprise instructions that, as a result of being executed by the one or more processors, cause the computer system to:
create a decoy resource that is accessible to the customer computer system;
detect an interaction with the decoy resource;
generate a new event record as a result of the interaction; and
add the new event record to the graph, the event record indicating a compromise of the customer computer system.

19. The non-transitory computer-readable storage medium of claim 18, wherein:
the decoy resource is a storage volume deployed on a network-connected storage device; and
the interaction is an attempt to access the storage volume.

20. The non-transitory computer-readable storage medium of claim 13, wherein the instructions further comprise instructions that, as a result of being executed by the one or more processors, cause the computer system to:
deploy a cryptographic key on a key management server;
determine that the cryptographic key has been used based at least in part on encrypted data or a digital signature created using the cryptographic key; and
generate a new event record that indicates that the key management server has been compromised.

* * * * *